US009016869B2

(12) United States Patent
Egawa et al.

(10) Patent No.: US 9,016,869 B2
(45) Date of Patent: Apr. 28, 2015

(54) OPTICAL DEVICE INCLUDING FRAME HOLDING LIGHT MODULATION UNIT HAVING DUSTPROOF GLASS AND PROJECTOR

(75) Inventors: Akira Egawa, Shiojiri (JP); Kaname Nagatani, Matsumoto (JP); Kunihiko Takagi, Okaya (JP); Tetsuo Shimizu, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 614 days.

(21) Appl. No.: 12/822,216

(22) Filed: Jun. 24, 2010

(65) Prior Publication Data

US 2010/0328621 A1 Dec. 30, 2010

(30) Foreign Application Priority Data

Jun. 30, 2009 (JP) ................................. 2009-154808

(51) Int. Cl.
*G03B 21/16* (2006.01)
*G02F 1/1333* (2006.01)

(52) U.S. Cl.
CPC .......... *G03B 21/16* (2013.01); *G02F 1/133308* (2013.01); *G02F 2001/133311* (2013.01); *G02F 2001/133331* (2013.01)

(58) Field of Classification Search
CPC .......... G02F 1/133308; G02F 2201/36; G02F 1/1333; H04N 9/3144; H04N 9/3147
USPC ........................ 353/61; 349/5–10, 58, 60, 161
See application file for complete search history.

(56) References Cited

U.S. PATENT DOCUMENTS

| 5,936,600 | A | * | 8/1999 | Ohashi et al. | .................... | 345/87 |
| 6,414,781 | B1 | | 7/2002 | Saitoh | | |
| 6,498,672 | B2 | | 12/2002 | Saitoh | | |
| 7,868,963 | B2 | | 1/2011 | Koyama et al. | | |
| 7,961,269 | B2 | | 6/2011 | Koyama et al. | | |
| 2003/0147036 | A1 | * | 8/2003 | Kaise et al. | .................... | 349/161 |
| 2004/0201877 | A1 | * | 10/2004 | Fujimori et al. | .............. | 359/245 |
| 2006/0082695 | A1 | * | 4/2006 | Miyashita | ........................ | 349/58 |

FOREIGN PATENT DOCUMENTS

| CN | 1873521 A | | 12/2006 |
| JP | 2000-347168 A | | 12/2000 |
| JP | 2000347168 A | * | 12/2000 |
| JP | 2002-107698 A | | 4/2002 |
| JP | 2004-272088 A | | 9/2004 |
| JP | 2004-279700 A | | 10/2004 |
| JP | 2008-209561 A | | 9/2008 |
| JP | 2009-128665 A | | 6/2009 |

* cited by examiner

*Primary Examiner* — Sultan Chowdhury
*Assistant Examiner* — Danell L Owens
(74) *Attorney, Agent, or Firm* — ALG Intellectual Property, LLC

(57) ABSTRACT

An optical device includes: a light modulation unit configured to modulate a light according to image information, including an element substrate having a pixel electrode and a switching element connected with the pixel electrode, and an opposed substrate disposed opposed to the element substrate; a frame configured to hold the light modulation unit; and an incident side dustproof glass disposed in close contact with a light incident side end surface of the opposed substrate, the incident side dustproof glass having the plane size larger than the plane size of the opposed substrate is disposed on the light incident side of the frame.

14 Claims, 6 Drawing Sheets

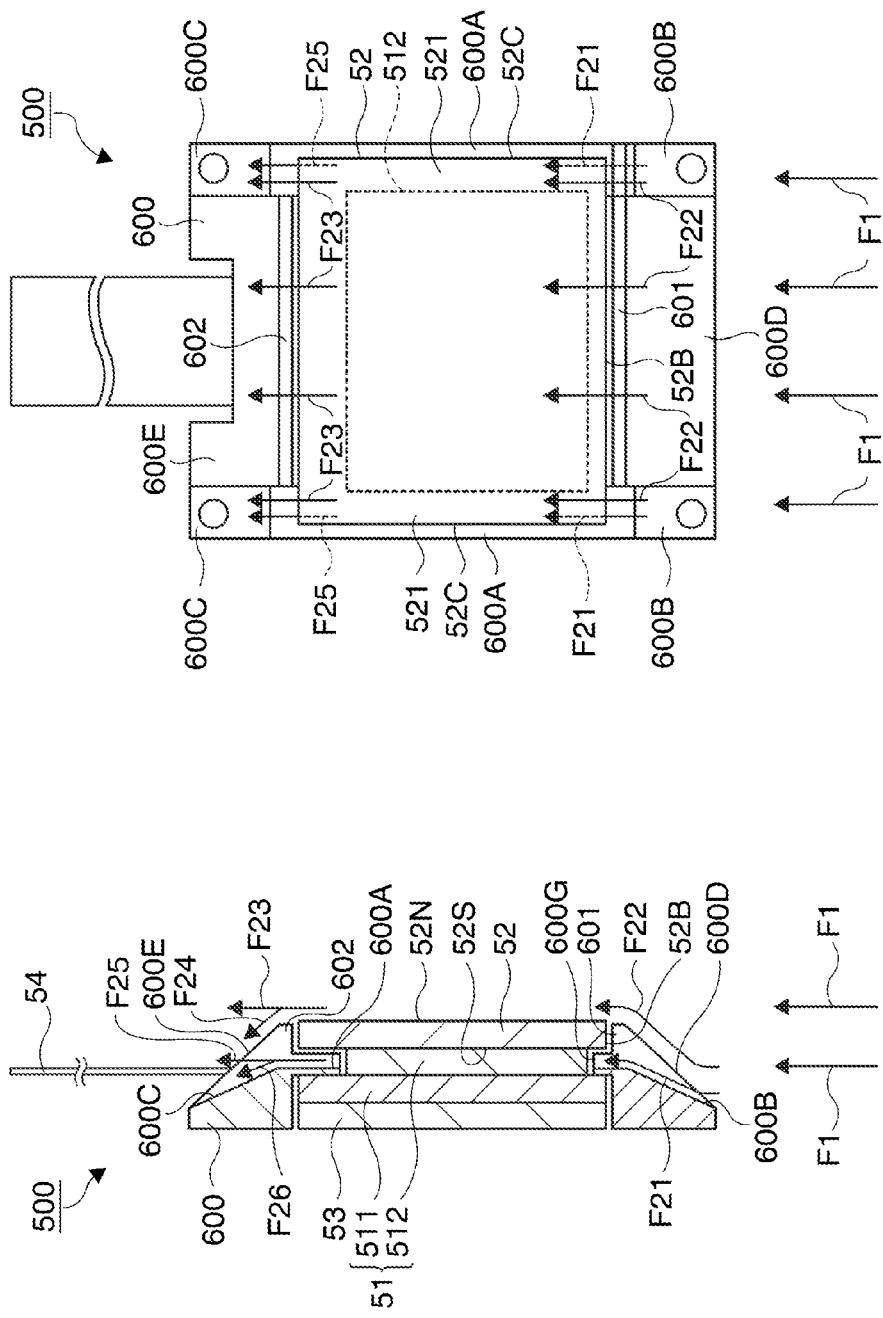

OPTICAL DEVICE INCLUDING FRAME HOLDING LIGHT MODULATION UNIT HAVING DUSTPROOF GLASS AND PROJECTOR

BACKGROUND

1. Technical Field

The present invention relates to an optical device having a light modulation unit, and a projector including this optical device.

2. Related Art

A projector which contains a light modulation unit for modulating light emitted from a light source according to image information and a projection unit for expanding and projecting the light modulated by the light modulation unit is known. For example, the light modulation unit is an active matrix drive type liquid crystal panel having a pair of substrates into which liquid crystals are sealed. In this case, the liquid crystal panel is held by a frame to be used as an optical device.

The liquid crystal panel generates heat when a liquid crystal layer, various types of wires, a black matrix and other components of the liquid crystal panel absorb light emitted from the light source. The generated heat deteriorates the liquid crystal panel in some cases. For overcoming this problem, a technology which cools the liquid crystal panel by supplying air to the optical device has been proposed (for example, see JP-A-2002-107698).

A projector shown in JP-A-2002-107698 includes an optical device (liquid crystal display element) having a transmission type liquid crystal panel and a frame, and a fan for supplying air to the optical device. The frame is so constructed as to hold the outer periphery of the liquid crystal panel, and a slope is formed at the end of the frame. Air supplied from the fan flows along this slope to be smoothly guided to the surface of the liquid crystal panel and used for cooling the liquid crystal panel.

According to the technology disclosed in JP-A-2002-107698, air is introduced to the surface of the liquid crystal panel by the function of the slope provided on the frame. However, since the outer periphery of the surface of the liquid crystal panel is covered by the frame with a step formed between the surface of the liquid crystal panel and the surface of the frame, there is a possibility that air is not guided to the entire area of the surface. In this case, the liquid crystal panel cannot be sufficiently cooled. When the number of revolutions of the fan is raised to sufficiently cool the liquid crystal panel, noise increases and thus makes an observer uncomfortable in some cases while observing image light projected from the projector.

SUMMARY

An advantage of some aspects of the invention is to solve at least a part of the problems described above and the invention can be embodied as the following embodiments and aspects.

A first aspect of the invention is directed to an optical device configured to modulate a light according to image information, including a light modulation unit which contains an element substrate having a pixel electrode and a switching element connected with the pixel electrode, and an opposed substrate disposed opposed to the element substrate; a frame configured to hold the light modulation unit; and an incident side dustproof glass disposed in close contact with a light incident side end surface of the opposed substrate. The incident side dustproof glass has the plane size larger than the plane size of the opposed substrate and disposed on the light incident side of the frame.

According to this structure, the incident side dustproof glass is disposed in close contact with the light incident side end surface of the opposed substrate. Thus, dust does not adhere to the light incident side end surface. Moreover, the incident side dustproof glass having the plane size larger than the plane size of the opposed substrate is disposed on the light incident side of the frame. That is, the outer peripheral end of the incident side dustproof glass projects from the outer peripheral end of the opposed substrate, and the entire surface of the incident side dustproof glass on the side for receiving light is exposed. In this case, the surface area of the incident side dustproof glass exposed to the outside becomes larger than that area of an incident side dustproof glass having substantially the same plane size as that of the opposed substrate and disposed on the optical path downstream side of the frame, i.e., inside the frame. Thus, heat can be efficiently released from the incident side dustproof glass, and the light modulation unit which generates heat when receiving light can be efficiently cooled. Accordingly, the light modulation unit can modulate received light in a stable condition while avoiding temperature increase.

In the optical device of the above aspect, it is preferable that the frame has a guiding portion disposed adjacent to an end surface of the incident side dustproof glass, the guiding portion guides an air supplied in a direction along a first surface for receiving the light of the incident side dustproof glass aiming at the optical device to the first surface.

According to this structure, the air supplied in the direction along the first surface toward the optical device is guided toward the first surface by the function of the guiding portion. Thus, the air can be efficiently supplied along the first surface without blocked by the outer peripheral end of the incident side dustproof glass projecting from the opposed substrate. As a result, heat release from the incident side dustproof glass can be improved, and thus the light modulation unit can be further efficiently cooled.

In the optical device of the above aspects, it is preferable that a clearance through that air flowing in a direction along a first surface for receiving the light of the incident side dustproof glass is formed between the frame and the incident side dustproof glass.

According to this structure, the clearance through which air flowing in the direction along the first surface flows is formed between the frame and the incident side dustproof glass. Thus, air can flow along the first surface and a second surface on the opposite side for forming the clearance, and along the portion of the frame opposed to the second surface. Accordingly, heat release can be achieved from both the surfaces of the incident side dustproof glass, and also heat release from the frame can be increased. Accordingly, the light modulation unit can be further efficiently cooled.

In the optical device of the above aspects, it is preferable that the frame has a guiding portion disposed adjacent to a first end surface of the incident side dustproof glass, the guiding portion guides an air supplied in a direction along a first surface for receiving the light of the incident side dustproof glass aiming at the optical device to the first surface. In this case, a clearance through which air flowing in the direction along the first surface is formed between the frame and an end of the incident side dustproof glass including a second end surface crossing the first end surface.

According to this structure, the frame has the guiding portion disposed adjacent to the first end surface, and the clearance is formed between the frame and the end of the incident side dustproof glass including the second end surface crossing the first end surface. In this case, the air supplied in the direction along the first surface toward the optical device is guided toward the first surface without producing great losses by the function of the guiding portion. Moreover, air can be supplied along the first surface and a second surface on the opposite side for forming the clearance, and along the portion of the frame opposed to the second surface. Accordingly, heat can be efficiently released from the first surface side of the incident side dustproof glass, and also from the second surface and the portion of the frame opposed to the second surface. Accordingly, heat release from the incident side dustproof glass and the frame can be improved, and thus the light modulation unit can be further efficiently cooled.

In the optical device of the above aspects, it is preferable that the element substrate is fixed to the frame by an adhesive.

According to this structure, the element substrate is fixed to the frame by the adhesive. Thus, heat generated from the light modulation unit when the light modulation unit receives light can be efficiently conducted to the frame. Accordingly, the light modulation unit can be efficiently cooled by the heat release from the frame.

A aspect of the invention is directed to a projector which includes: a light source; the optical device according to the above aspects; and a projection device which projects the light modulated by the optical device.

According to this structure, the projector includes the optical device described above. Thus, the light modulation unit can be efficiently cooled, and image light having preferable quality can be projected for a long period. Accordingly, the life of the projector can be prolonged.

BRIEF DESCRIPTION OF THE DRAWINGS

The invention will be described with reference to the accompanying drawings, wherein like numbers reference like elements.

FIG. 5A is a cross-sectional view of an optical device according to a third embodiment.

FIG. 5B is a front view of the optical device according to the third embodiment.

DESCRIPTION OF EXEMPLARY EMBODIMENTS

First Embodiment

A projector according to a first embodiment is hereinafter described with reference to the drawings. The projector in this embodiment forms image light by modulating light emitted from a light source according to image information, and expands and projects the image light on a screen or the like.

Figure 1:
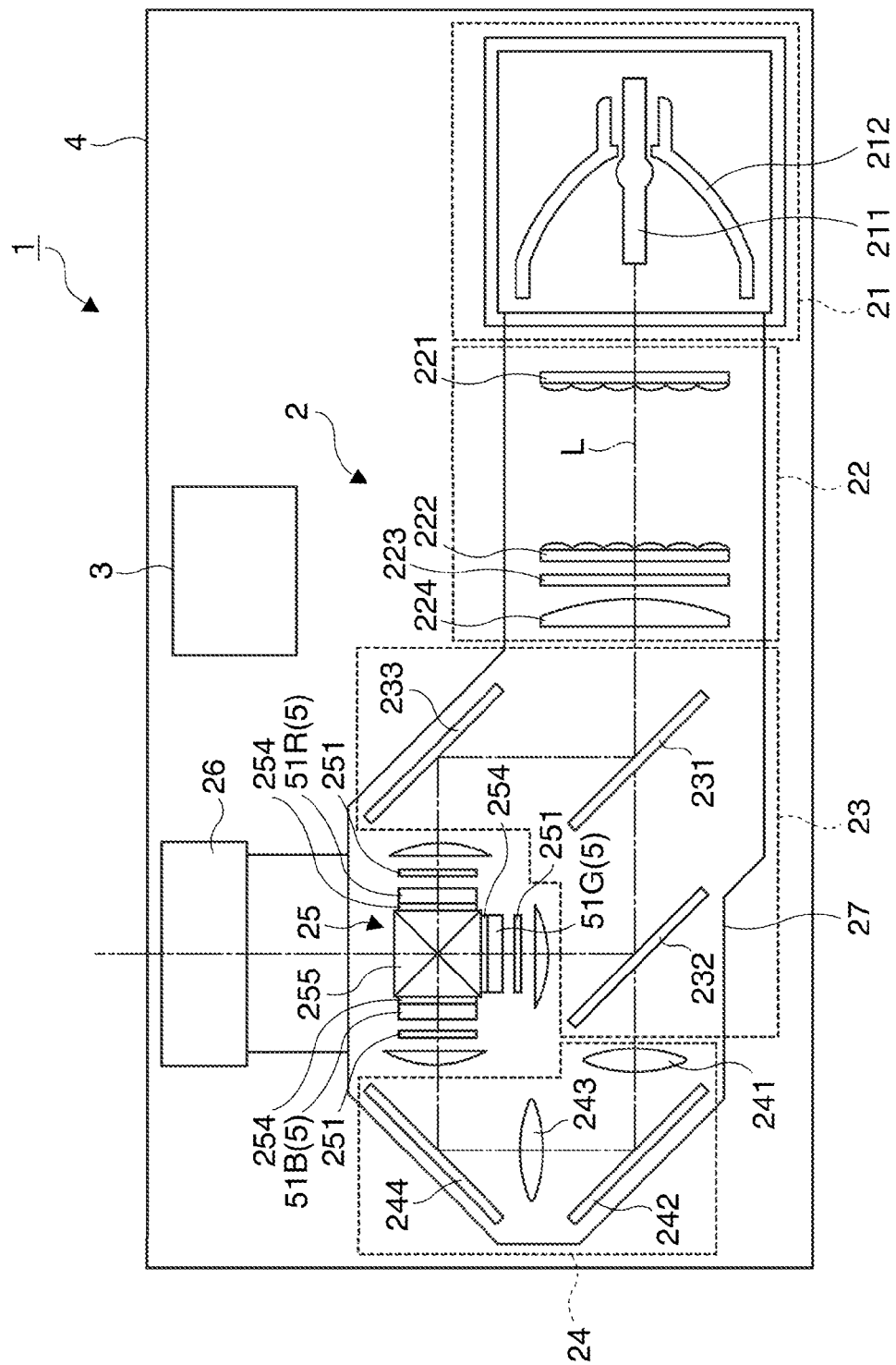
FIG. 1 schematically illustrates the general structure of a projector according to a first embodiment.

FIG. 1 schematically illustrates the general structure of the projector according to this embodiment.

As illustrated in FIG. 1, a projector 1 includes an optical unit 2 containing a light source 211 and having a substantially L shape, a cooling fan 3 for cooling the optical unit 2, an external housing 4 constituting an external case, a not-shown control unit, a not-shown power source device for supplying power to the components such as the light source 211 and the control unit, and others.

The control unit has a CPU (central processing unit), a ROM (read only memory), a RAM (random access memory) and the like, and functions as a computer. The control unit controls operations of the projector 1 such as operation associated with image projection.

The optical unit 2 performs optical processing for light emitted from the light source 211 under the control of the control unit, and forms and projects image light corresponding to image information.

As illustrated in FIG. 1, the optical unit 2 includes a light source device 21, an illumination device 22, a color separation device 23, a relay device 24, an electro-optical device 25, a projection lens 26 as a projection device, and an optical component housing 27 which disposes these optical components at predetermined positions.

The light source device 21 has the discharge type light source 211 constituted by an extra-high pressure mercury lamp, a metal halide lamp or the like, a reflector 212 and others. The light source device 21 equalizes the emission direction of the light emitted from the light source 211 by using the reflector 212, and supplies the equalized light to the illumination device 22.

The illumination device 22 has a first lens array 221, a second lens array 222, a polarization converting element 223, and a stacking lens 224.

The first lens array 221 has small lenses disposed in matrix, each of which lenses has a substantially rectangular contour as viewed in the direction of an optical axis L of the light emitted from the light source 211. The first lens array 221 divides the light received from the light source device 21 into plural partial lights. The second lens array 222 having structure substantially similar to that of the first lens array 221 supplies the partial lights to liquid crystal panels 51 described later such that the partial lights become substantially stacked lights on the surfaces of the liquid crystal panels 51 in cooperation with the stacking lens 224. The polarization converting element 223 has a function of converting random polarized lights released from the second lens array 222 into substantially one type of polarized lights allowed to be used by the liquid crystal panels 51.

The color separation device 23 includes two dichroic mirrors 231 and 232 and a reflection mirror 233, and has a function of separating the lights received from the illumination device 22 into three color lights of red light (hereinafter referred to as "R light"), green light (hereinafter referred to as "G light"), and blue light (hereinafter referred to as "B light").

The relay device 24 includes an incident side lens 241, a relay lens 243, and reflection mirrors 242 and 244, and has a function of guiding the B light separated by the color separation device 23 toward the liquid crystal panel 51B for B light. While the B light is guided by the relay device 24 in the optical unit 2, other lights such as the R light may be guided by the relay device 24.

The electro-optical device 25 has incident side polarization plates 251, optical devices 5, exit side polarization plates 254, and a cross dichroic prism 255 as a color combining device, and modulates the respective color lights separated by the color separation device 23 according to image information to form image light.

The incident side polarization plates 251 are provided for each of the three color lights with one-to-one correspondence. Each of the incident side polarization plates 251 transmits the polarized light contained in the color light separated by the color separation device 23 and equalized by the polarization converting element 223, and absorbs polarized light different from the equalized polarized light to supply the equalized polarized light to the optical devices 5.

The optical devices 5 are provided for each of the three color lights with one-to-one correspondence. The optical devices 5 contain the liquid crystal panels 51 as light modulation elements (liquid crystal panel 51R for the R light, liquid crystal panel 51G for the G light, and liquid crystal panel 51B for the B light) to modulate the polarization directions of the polarized lights received from the incident side polarization plates 251. The details of the optical devices 5 will be described later.

The exit side polarization plates 254 have functions substantially similar to those of the incident side polarization plates 251. That is, the exit side polarization plates 254 transmit polarized lights received from the liquid crystal panels 51 and having a fixed direction, and absorb the other lights.

The cross dichroic prism 255 has a substantially square shape in the plan view formed by affixing four rectangular prisms, and contains two dielectric multilayer films on the interfaces of the affixed rectangular prisms. The dielectric multilayer films reflect the color lights released from the liquid crystal panels 51R and 51B and received via the exit side polarization plates 254, and transmit the color light released from the liquid crystal panel 51G and received via the exit side polarization plate 254. By this method, the cross dichroic prism 255 combines the respective color lights modulated by the liquid crystal panels 51R, 51G and 51B to form image light.

The projection lens 26 is a lens unit as a combination of plural lenses for expanding and projecting the image light produced by the electro-optical device 25 on the screen.

The cooling fan 3 is constituted by a sirocco fan which delivers air to the optical devices 5 via a not-shown duct to cool the optical devices 5.

The details of the optical devices 5 are now explained.

Figure 2:
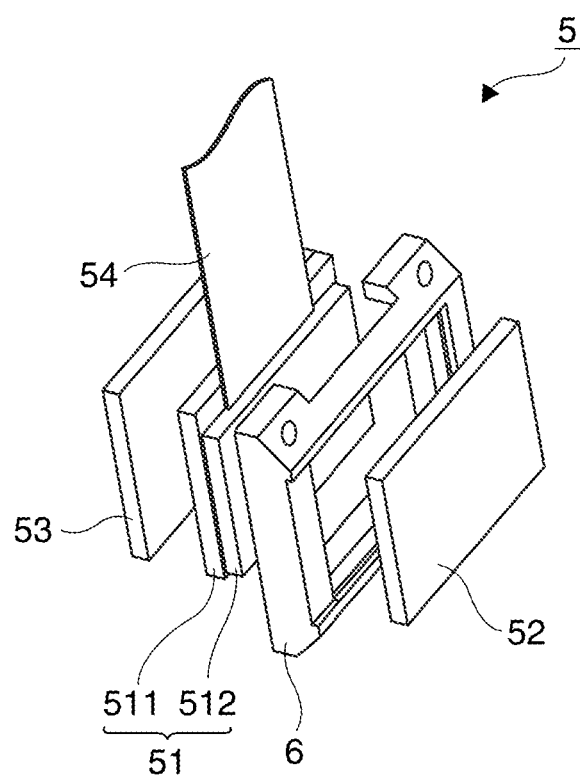
FIG. 2 is a perspective view illustrating a disassembled optical device according to the first embodiment.
Figures 3A, 3B:
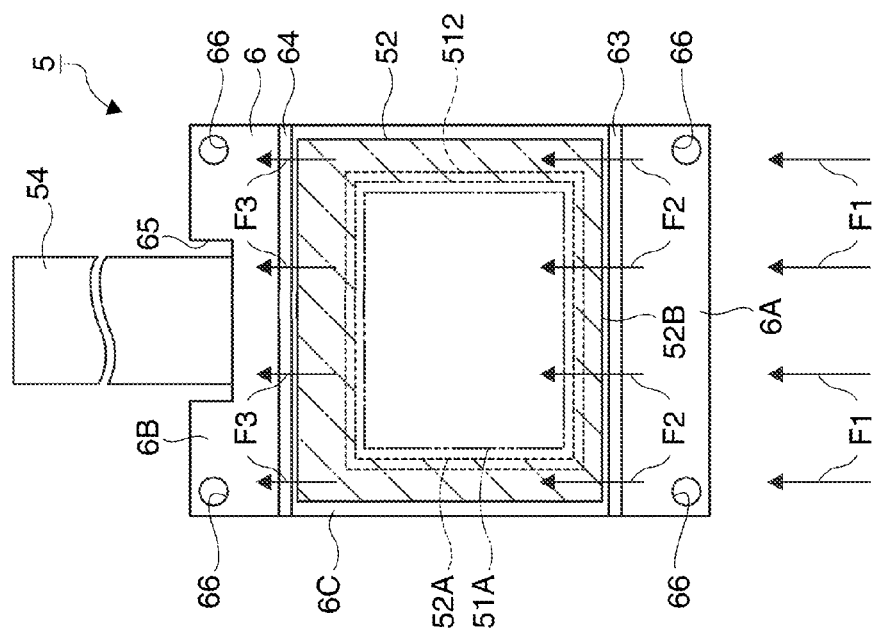
FIG. 3A is a cross-sectional view of the optical device according to the first embodiment.
FIG. 3B is a front view of the optical device according to the first embodiment.

FIG. 2 is a perspective view illustrating the disassembled condition of one of the optical devices 5. FIG. 3A is a cross-sectional view of the optical device 5, and FIG. 3B is a front view of the optical device 5 as viewed from the light incident side. It should be noted that the dimensions and proportions of the respective constituent elements shown in FIG. 2 and FIGS. 3A and 3B are changed from the actual ones as necessary to show these elements in sufficient sizes to be visually recognized in the figures.

As illustrated in FIGS. 2 through 3B, the optical device 5 has an incident side dustproof glass 52, an exit side dustproof glass 53, a flexible printed board 54, and a frame 6 as well as the liquid crystal panel 51.

As illustrated in FIGS. 2 through 3B, the liquid crystal panel 51 has a rectangular element substrate 511 and an opposed substrate 512 made of glass or the like, and liquid crystals as electro-optical substances sealed between the substrates 511 and 512.

The element substrate 511 is a drive substrate for driving the liquid crystals. The element substrate 511 has a plurality of data lines disposed in parallel with one another, a plurality of scanning lines disposed in such directions as to cross the plural data lines at right angles, pixel electrodes disposed in matrix in correspondence with the cross points of the scanning lines and the data lines, and switching elements such as TFTs (thin film transistors) and MIMs (metal insulator metals) electrically connected with the data lines, the scanning lines, and the pixel electrodes. A connection terminal for electrically connecting with the control unit is provided at one end of the element substrate 511.

The opposed substrate 512 is a substrate disposed opposed to the element substrate 511 with a predetermined space left between the opposed substrate 512 and the element substrate 511. The opposed substrate 512 has a common electrode, a black matrix and the like to which predetermined voltage is applied. The plane size of the opposed substrate 512 is smaller than the plane size of the element substrate 511. Thus, the connection terminal of the element substrate 511 is exposed, and the side of the element substrate 511 opposed to the connection terminal area projects from the opposed substrate 512. In the following description, the upper side corresponds to the side where the connection terminal is disposed, and the right side corresponds to the right side in FIG. 3B for simplifying the explanation. In addition, the surface of the element substrate 511 on the side projecting from the opposed substrate 512 and facing the opposed substrate 512 is referred to as a projecting surface.

One end of the flexible printed board 54 is electrically connected and fixed to the connection terminal area of the element substrate 511, and the other end is detachably connected with the control unit.

When a drive signal is inputted from the control unit to the liquid crystal panel 51 via the flexible printed board 54, voltage is applied between the predetermined pixel electrodes and the common electrode. As a result, the orientation conditions of the liquid crystals interposed between the pixel electrodes and the common electrode of the liquid crystal panel 51 are controlled, and thus the polarization direction of the polarized light received from the incident side polarization plate 251 is modulated.

The incident side dustproof glass 52 is a rectangular component made of plate material capable of transmitting light such as quartz glass and having a plane size larger than the plane size of the opposed substrate 512. As illustrated in FIGS. 3A and 3B, the four sides of the incident side dustproof glass 52 project from the opposed substrate 512. The incident side dustproof glass 52 is closely fixed to a light incident side end surface 512N of the opposed substrate 512 by using an adhesive such as a silicon adhesive.

The incident side dust proof glass 52 has functions of preventing adhesion of dust to the light incident side end surface 512N, and releasing heat generated on the liquid crystal panel 51 when the liquid crystal panel 51 absorbs light emitted from the light source. A reflection film 52A formed by deposition or other methods is provided on a second surface 52S of the incident side dustproof glass 52 opposite to a first surface 52N for receiving light. As illustrated in FIG. 3B, the reflection film 52A is disposed in an area outside an image forming area 51A of the liquid crystal panel 51 to reflect light supplied to the optical device 5 but not contributing to formation of image light.

The exit side dustproof glass 53 is made of plate material capable of transmitting light such as quartz glass similarly to the incident side dustproof glass 52. As illustrated in FIG. 3A, the plane size of the exit side dustproof glass 53 is substantially equal to the plane size of the element substrate 511. The exit side dustproof glass 53 is closely fixed to an exit side end surface 511S of the element substrate 511 for releasing light by using an adhesive such as a silicon adhesive. The exit side dustproof glass 53 has functions of preventing adhesion of dust to the exit side end surface 511S and releasing heat from the liquid crystal panel 51.

Adhesion of dust to the light incident side end surface 512N and the exit side end surface 511S is prevented by the incident side dustproof glass 52 and the exit side dustproof glass 53. Since dust adhering to the first surface 52N of the incident side dustproof glass 52 and the surface of the exit side dustproof glass 53 for releasing light is located at a position shifted from the focus, deterioration of the projected image such as display shade can be suppressed. The materials of the incident side dustproof glass 52 and the exit side dustproof glass 53 are not limited to quartz glass but may be sapphire, crystal or the like.

The frame 6 is so structured as to hold the liquid crystal panel 51, and is attached to the cross dichroic prism 255 by attachment pins.

The frame 6 made of magnesium alloy has a substantially rectangular shape, and includes an accommodating portion 61, an opening 62, a guiding portion 63, a supplementary guiding portion 64, a notch 65, and attachment holes 66. As illustrated in FIG. 3A, the frame 6 has a slope 6A and a slope 6B. The lower end of the slope 6A and the upper end of the slope 6B have beveled corners on the light receiving side.

The accommodating portion 61 is a concave in which the element substrate 511 and the exit side dustproof glass 53 are accommodated. The accommodating portion 61 has a rectangular shape in the plan view, and includes a bottom surface 61A.

The opening 62 is formed on the bottom surface 61A as an opening through which the color light released from the incident side polarization plate 251 passes. The opening 62 is so sized as to become larger than the external size of the opposed substrate 512. The thickness of an edge 67 of the opening 62, more specifically, the dimension defined by an outer surface 6C on the side for receiving light and the bottom surface 61A is made smaller than the plate thickness of the opposed substrate 512.

As illustrated in FIG. 3A, the liquid crystal panel 51 is held by the frame 6 by insertion of the opposed substrate 512 into the opening 62 and bonding of the projecting surface of the element substrate 511 in the area other than the connection terminal to the bottom surface 61A. The liquid crystal panel 51 is disposed on the frame 6 with the light incident side end surface 512N of the opposed substrate 512 projecting from the outer surface 6C. The incident side dustproof glass 52 is positioned on the optical path upstream side of the frame 6 while bonded to the light incident side end surface 512N of the opposed substrate 512 projecting from the outer surface 6C of the frame 6.

When assembling the liquid crystal panel 51 and the frame 6, these parts are positioned with reference to at least one surface of the projecting surfaces of the element substrate 511 bonded to the bottom surface 61A, and the side surface of the opposed substrate 512 disposed adjacent to the one projecting surface. In addition, when bonding the incident side dustproof glass 52 to the light incident side end surface 512N of the opposed substrate 512, these parts are positioned with reference to the frame 6. By determining these references, the opposed substrate 512 and the incident side dustproof glass 52, particularly the black matrix of the opposed substrate 512 and the reflection film 52A of the incident side dustproof glass 52 can be accurately positioned.

The guiding portion 63 projecting from the outer surface 6C is so constructed that air delivered from the cooling fan 3 can be efficiently supplied toward the first surface 52N of the incident side dustproof glass 52. More specifically, as illustrated in FIG. 3A, the guiding portion 63 is disposed adjacent to the lower end surface of the incident side dustproof glass 52 (a first end surface 52B). The upper end of the guiding portion 63 is slightly lower than that of the first surface 52N of the incident side dustproof glass 52, and the lower surface of the guiding portion 63 follows the slope 6A.

The supplementary guiding portion 64 is almost symmetrized with the guiding portion 63 in shape, and disposed adjacent to the upper end surface of the incident side dustproof glass 52. More specifically, as illustrated in FIG. 3A, the lower end of the supplementary guiding portion 64 is slightly lower than the first surface 52N of the incident side dustproof glass 52, and the upper surface of the supplementary guiding portion 64 follows the slope 6B.

Accordingly, the frame 6 has substantially no area for blocking the flow of air between the slope 6A and the first surface 52N and between the first surface 52N and the slope 6B.

The notch 65 as a portion for receiving the flexible printed board 54 is notched upward from the accommodating portion 61. The attachment holes 66 are through holes into which attachment pins are inserted, and are provided at four corners of the frame 6 as illustrated in FIG. 3B. The material of the frame 6 is not limited to magnesium alloy but may be other metal material or synthetic resin.

The flow of air supplied to the optical device 5 is now described.

As explained above, the cooling fan 3 supplies delivered air to the optical device 5 via the duct to cool the optical device 5. More specifically, the cooling fan 3 and the duct are so constructed as to supply air delivered from the cooling fan 3 to the optical device 5 from below, that is, from the side opposite to the side connected with the flexible printed board 54. Further specifically, the cooling fan 3 and the duct are so structured as to supply air toward the optical device 5 in the direction along the first surface 52N of the incident side dustproof glass 52.

As illustrated in FIG. 3A, air delivered from the cooling fan 3, introduced through the duct and supplied to the optical device 5 (flow F1) is directly supplied to the first surface 52N, and also to the frame 6. The air having reached the frame 6 flows from the slope 6A and along the guiding portion 63, and then smoothly flows along the first surface 52N (flow F2). The air directly supplied to the first surface 52N and the air of the flow F2 reach the substantially entire surface of the first surface 52N, and flow upward while robbing heat from the incident side dustproof glass 52 having a high temperature due to heat generation on the liquid crystal panel 51 (flow F3). A part of the air having flowed upward along the incident side dustproof glass 52 flows along the supplementary guiding portion 64 and the slope 6B (flow F4).

Accordingly, the air delivered from the cooling fan 3 to the optical device 5, that is, the air supplied toward the optical device 5 in the direction along the first surface 52N smoothly flows along the first surface 52N without producing great loss of the air amount and the flow speed by the function of the guiding portion 63 to release heat from the incident side dustproof glass 52. As a result, the liquid crystal panel 51 is cooled by the heat release from the incident side dustproof glass 52.

The projector 1 according to this embodiment can offer the following advantages.

(1) The plane size of the incident side dustproof glass 52 is larger than that of the opposed substrate 512, and the first surface 52N of the incident side dustproof glass 52 is exposed to the outside. In this case, the surface area of the incident side dustproof glass 52 exposed to the outside becomes larger than that area of an incident side dustproof glass having substantially the same plane size as that of the opposed substrate 512 and disposed within the frame 6. Thus, heat can be efficiently released from the incident side dustproof glass 52, and therefore the liquid crystal panel 51 which generates heat by receiving light can be efficiently cooled. Accordingly, the liquid crystal panel 51 can modulate received light in a stable condition while avoiding temperature increase.

(2) The air delivered from the cooling fan 3 is introduced to the first surface 52N by the function of the guiding portion 63. Thus, the air can be efficiently supplied along the first surface 52N without blocked by the outer peripheral end of the incident side dustproof glass 52 projecting from the opposed substrate 512. As a result, heat release from the incident side dustproof glass 52 is improved, and thus the temperature increase of the liquid crystal panel 51 can be further suppressed. Moreover, since the air delivered from the cooling fan 3 is efficiently guided to the first surface 52N, the number of revolutions of the cooling fan 3 can be lowered. Thus, noise reduction can be achieved.

(3) The supplementary guiding portion 64 provided on the frame 6 allows the air to smoothly flow upward from the optical device 5. Accordingly, howling or the like produced by air turbulence can be suppressed, and thus noise reduction can be achieved.

(4) The element substrate 511 is fixed to the frame 6 by the adhesive. Thus, the heat generated from the liquid crystal panel 51 can be efficiently conducted to the frame 6. Accordingly, the liquid crystal panel 51 can be efficiently cooled by the heat release from the frame 6 achieved by the air delivered from the cooling fan 3.

(5) The plane size of the incident side dustproof glass 52 is large, and the reflection film 52A can be provided in a wide area of the incident side dustproof glass 52. Thus, the amount of light applied to the frame 6 can be decreased. Accordingly, heat generation from the frame 6 can be reduced, and thus the temperature increase of the liquid crystal panel 51 can be lowered.

(6) According to the projector 1 including the optical device 5 described above, the liquid crystal panel 51 can be efficiently cooled, and thus image light having preferable quality can be projected for a long period. Accordingly, the life of the projector 1 can be prolonged.

Second Embodiment

The projector 1 according to a second embodiment is now described with reference to the drawings. In the following explanation, similar reference numbers are given to structures and parts similar to those of the first embodiment, and the same detailed description is not repeated or simplified.

The projector 1 according to this embodiment has an optical device 50 which includes a frame 60 having a shape different from that of the frame 6 in the first embodiment.

Figures 4A, 4B:
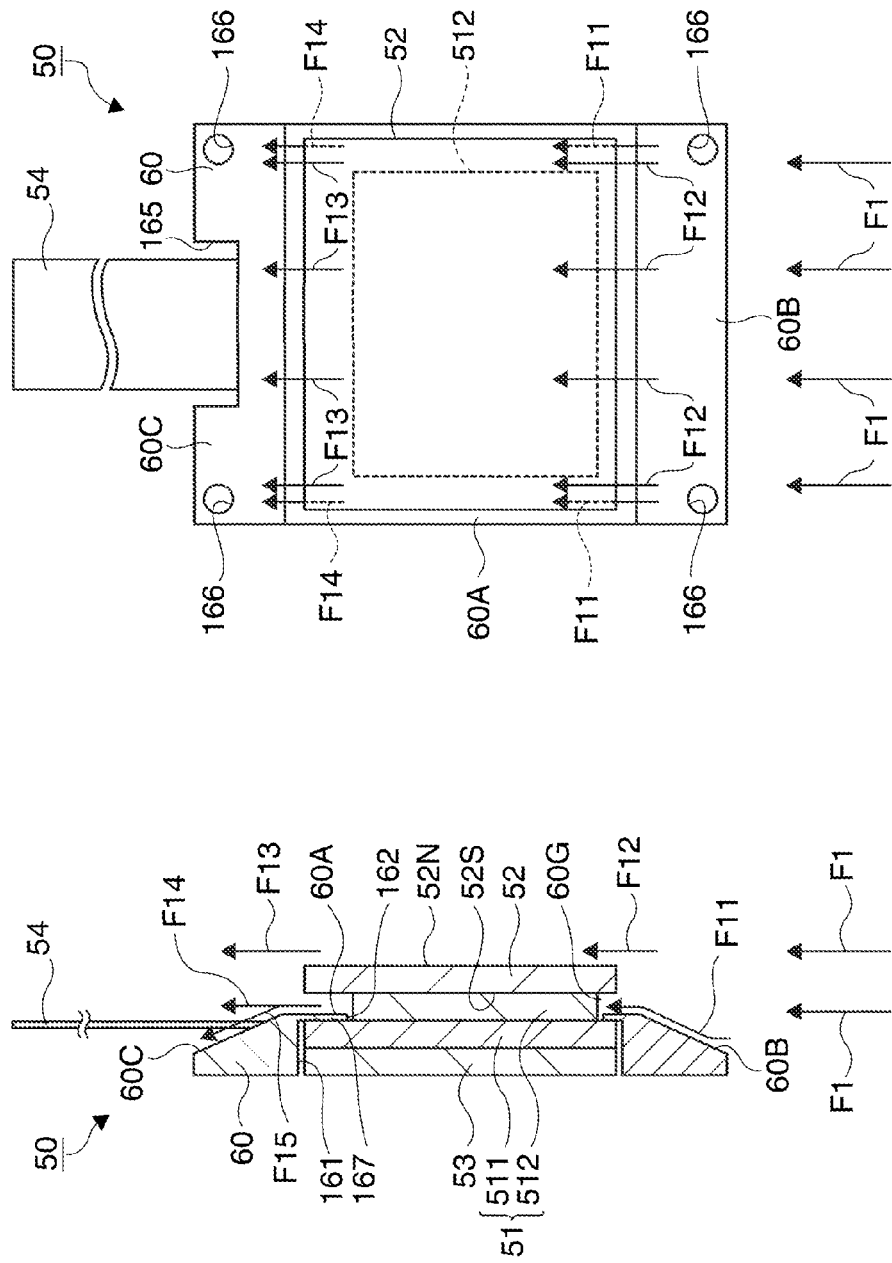
FIG. 4A is a cross-sectional view of an optical device according to a second embodiment.
FIG. 4B is a front view of the optical device according to the second embodiment.

FIG. 4A is a cross-sectional view of the optical device 50, and FIG. 4B is a front view of the optical device 50 as viewed from the light incident side. The dimensions and proportions of the respective constituent elements shown in FIGS. 4A and 4B are changed from the actual ones as necessary to show these elements in sufficient sizes to be visually recognized in the figures. As illustrated in FIGS. 4A and 4B, the frame 60 includes an accommodating portion 161 for accommodating the liquid crystal panel 51, an opening 162 through which light passes, a notch 165 for receiving the flexible printed board 54, and attachment holes 166 into which attachment pins are inserted similarly to the frame 6 in the first embodiment.

As illustrated in FIG. 4A, the thickness of an edge 167 of the opening 162 is smaller than that of the edge 67 of the frame 6 in the first embodiment, and clearances 60G through which air can flow are formed between an outer surface 60A of the frame 60 on the side for receiving light and the second surface 52S of the incident side dustproof glass 52. More specifically, the clearances 60G are provided between the outer surface 60A and the left and right ends of the second surface 52S projecting from the opposed substrate 512 such that air supplied in the direction along the first surface 52N can flow through the clearances 60G. Thus, the clearances 60G are paths through which the air delivered from the cooling fan 3 can flow. As illustrated in FIG. 4A, the frame 60 has a slope 60B having a beveled corner at the lower end on the light receiving side and a slope 60C having a beveled corner at the upper end on the light receiving side.

The flow of air supplied to the optical device 50 is now explained.

As illustrated in FIG. 4A, air delivered from the cooling fan 3, introduced through the duct and supplied to the optical device 50 (flow F1) is directly supplied to the first surface 52N, and also to the frame 60. A part of the air having reached the frame 60 (both ends of the frame 60) flows along the slope 60B, and then flows into the clearances 60G (flow F11). On the other hand, most of the other part of the air flows along the first surface 52N (flow F12).

The air directly supplied to the first surface 52N and the air of the flow F12 reach the substantially entire area of the first surface 52N, and flow upward while robbing heat from the first surface 52N of the incident side dustproof glass 52 (flow F13). On the other hand, the air having flowed into the clearances 60G flows upward while robbing heat from the second surface 52S of the incident side dustproof glass 52 and the outer surface 60A of the frame 60 forming the clearances 60G (flow F14). A part of the air of the flow F14 flows along the slope 60C (flow F15).

Accordingly, the air delivered from the cooling fan 3 toward the optical device 50 releases heat from both the surfaces of the incident side dustproof glass 52 to cool the liquid crystal panel 51.

The projector 1 according to this embodiment can offer the following advantage as well as the advantages (1) and (4) through (6) of the first embodiment.

(1) According to this embodiment, the clearances 60G through which the air delivered from the cooling fan 3 flows are formed between the frame 60 and the incident side dustproof glass 52. Thus, heat release can be achieved from both the surfaces of the incident side dustproof glass 52, and also heat release from the frame 60 can be increased. Accordingly, the liquid crystal panel 51 can be further efficiently cooled.

Third Embodiment

The projector 1 according to a third embodiment is now described with reference to the drawings. In the following explanation, similar reference numbers are given to structures and parts similar to those of the first embodiment, and the same detailed description is not repeated or simplified.

The projector 1 according to this embodiment includes an optical device 500 which contains a frame 600 having a shape different from that of the frame 6 in the first embodiment.

FIG. 5A is a cross-sectional view of the optical device 500, and FIG. 5B is a front view of the optical device 500 as viewed from the light incident side. The dimensions and proportions of the respective constituent elements shown in FIGS. 5A and 5B are changed from the actual ones as necessary to show these elements in sufficient sizes to be visually recognized in the figures. As illustrated in FIGS. 5A and 5B, the frame 600 has a shape whose left and right ends of the outer surface on the side for receiving light are notched from the shape of the frame 6 in the first embodiment.

More specifically, as illustrated in FIGS. 5A and 5B, the frame 600 has outer surfaces 600A at the left and right ends, and clearances 600G are formed between the outer surfaces 600A and left and right ends 521 of the incident side dustproof glass 52, which ends 521 contain second end surfaces 52C crossing the first end surface 52B. The clearances 600G are so structured that the air flowing in the direction along the first surface 52N, that is, the air delivered from the cooling fan 3 can flow through the clearances 600G similarly to the clearances 60G in the second embodiment. As illustrated in FIG. 5A, slopes 600B and 600C inclined to have decreased end thicknesses are formed below and above the left and right outer surfaces 600A, respectively.

As illustrated in FIGS. 5A and 5B, the frame 600 includes a guiding portion 601 formed adjacent to the first end surface 52B of the incident side dustproof glass 52, a supplementary guiding portion 602 formed adjacent to the upper end surface of the incident side dustproof glass 52, a lower slope 600D, and an upper slope 600E. The guiding portion 601 is disposed between the area along the left edge of the opposed substrate 512 and the area along the right edge of the opposed substrate 512, and the cross-sectional shape of the guiding portion 601 has the same size as that of the guiding portion 63 of the frame 6 in the first embodiment. Similarly, the supplementary guiding portion 602 is disposed between the area along the left edge of the opposed substrate 512 and the area along the right edge of the opposed substrate 512, and the cross-sectional shape of the supplementary guiding portion 602 has the same size as that of the supplementary guiding portion 64 of the frame 6 in the first embodiment.

The flow of air supplied to the optical device 500 is now explained.

As illustrated in FIG. 5A, the air delivered from the cooling fan 3, introduced through the duct and blown toward the optical device 500 (flow F1) is directly supplied to the first surface 52N and also to the frame 600. A part of the air having reached to the frame 600 flows along the left and right slopes 600B and flows into the clearances 600G (flow F21). Most of the other part of the air smoothly flows from the slope 600D along the guiding portion 601 toward the first surface 52N (flow F22).

The air directly supplied to the first surface 52N and the air of the flow F22 reach the substantially entire area of the first surface 52N, and flow upward while robbing heat from the first surface 52N of the incident side dustproof glass 52 (flow F23). A part of the flow F23 flows along the slope 600E (flow F24). On the other hand, the air having flowed into the clearances 600G flows upward while robbing heat from the second surface 52S of the incident side dustproof glass 52 and the outer surfaces 600A of the frame 600 forming the clearances 600G (flow F25). A part of the flow F25 flows along the slopes 600C (flow F26).

Accordingly, the air delivered from the cooling fan 3 toward the optical device 500 smoothly flows along the first surface 52N without producing great loss of the air amount and the flow speed by the function of the guiding portion 601, and also releases heat from the second surface 52S of the incident side dustproof glass 52 and the frame 600 while flowing through the clearances 600G to cool the liquid crystal panel 51.

The projector according to this embodiment can offer the following advantage as well as the advantages (1) through (6) in the first embodiment.

(1) According to this embodiment, the guiding portion 601 for guiding the air delivered from the cooling fan 3 toward the first surface 52N is provided on the frame 600, and the clearances 600G through which the air delivered from the cooling fan 3 flows are formed between the frame 600 and the incident side dustproof glass 52. In this case, heat can be efficiently released from the first surface 52N of the incident side dustproof glass 52, and also heat can be released from the second surface 52S of the incident side dustproof glass 52 and from the outer surfaces 600A of the frame 600 forming the clearances 600G. Accordingly, heat release from the incident side dustproof glass 52 and the frame 600 can be improved, and thus the liquid crystal panel 51 can be further efficiently cooled.

Modified Example

The embodiments described above can be modified in the following manners.

While the projector 1 according to the embodiments is the front type projector 1, the projector 1 may be a rear type projector which has a screen as a projection target surface combined with the projector as one body.

The light source 211 is not limited to the discharge type lamp but may be other types of lamp or solid light sources such as light emitting diode.

Figure 6:
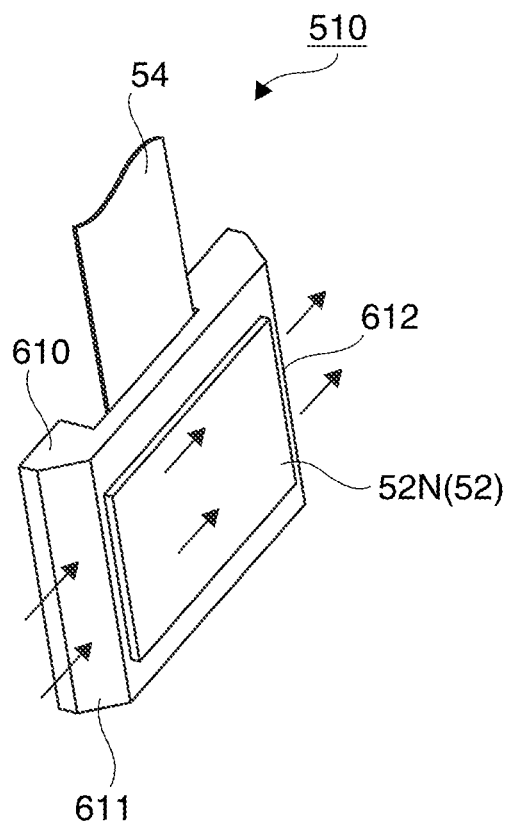
FIG. 6 is a perspective view schematically illustrating an optical device according to a modified example.

According to the embodiments, the air delivered from the cooling fan 3 is supplied from below to the optical devices 5, 50, and 500. However, air may be supplied in other directions such as from the left or the right of the optical device. In this case, the optical device is constructed to be suited for the air flowing in these directions. FIG. 6 is a perspective view schematically illustrating an optical device 510 in a modified example. As illustrated in FIG. 6, the optical device 510 is so structured as to be suited for air supplied from the left, and a guiding portion 611 and a supplementary guiding portion 612 are provided at the left and right ends of a frame 610, respectively. Air supplied from the left of the optical device 510 flows along the guiding portion 611, and reaches the substantially entire area of the first surface 52N. Then, the air flows along the supplementary guiding portion 612 toward the right. Though not shown in the figure, clearances through which air in the left-right direction can flow may be provided between the frame 610 and the incident side dustproof glass 52 similarly to the optical devices 50 and 500 in the embodiments.

The entire disclosure of Japanese Patent Application No. 2009-154808, filed Jun. 30, 2009 is expressly incorporated by reference herein.

What is claimed is:
1. An optical device comprising:
  a light modulation unit configured to modulate a light according to image information, including
    an element substrate having a pixel electrode and a switching element connected with the pixel electrode, and
    an opposed substrate disposed opposed to the element substrate;
  a frame configured to hold the light modulation unit; and
  an incident side dustproof glass disposed in direct contact with a light incident side end surface of the opposed substrate,
  wherein a first surface for receiving the light of the incident side dustproof glass is located further from the light incident side end surface of the opposed substrate than an end surface of the light incident side of the frame, the end surface of the light incident side of the frame being located further from the light incident side end surface of the opposed substrate than any other surface of the frame in a direction perpendicular to the light incident side end surface of the opposed substrate.

2. The optical device according to claim 1, wherein the frame has a guiding portion disposed adjacent to an end surface of the incident side dustproof glass, the guiding portion guides an air supplied from a direction along a first surface for receiving the light of the incident side dustproof glass aiming at the optical device to the first surface.

3. The optical device according to claim 1, wherein a clearance through which air flowing in a direction along a first surface for receiving the light of the incident side dustproof glass is formed between the frame and the incident side dustproof glass.

4. The optical device according to claim 1, wherein the frame has a guiding portion disposed adjacent to a first end surface of the incident side dustproof glass, the guiding portion guides an air supplied in a direction along a first surface for receiving the light of the incident side dustproof glass aiming at the optical device to the first surface; and a clearance through which air flowing in the direction along the first surface is formed between the frame and an end of the incident side dustproof glass including a second end surface crossing the first end surface.

5. The optical device according to claim 1, wherein the element substrate is fixed to the frame by an adhesive.

6. A projector comprising:
a light source;
the optical device according to claim 1; and
a projection device configured to project the light modulated by the optical device.

7. The projector according to claim 6, wherein the frame has a guiding portion disposed adjacent to an end surface of the incident side dustproof glass, the guiding portion guides an air supplied from a direction along a first surface for receiving the light of the incident side dustproof glass aiming at the optical device to the first surface.

8. The projector according to claim 6, wherein a clearance through which air flowing in a direction along a first surface for receiving the light of the incident side dustproof glass is formed between the frame and the incident side dustproof glass.

9. The projector according to claim 6, wherein the frame has a guiding portion disposed adjacent to a first end surface of the incident side dustproof glass, the guiding portion guides an air supplied in a direction along a first surface for receiving the light of the incident side dustproof glass aiming at the optical device to the first surface; and a clearance through which air flowing in the direction along the first surface is formed between the frame and an end of the incident side dustproof glass including a second end surface crossing the first end surface.

10. The projector according to claim 6, wherein the element substrate is fixed to the frame by an adhesive.

11. The optical device according to claim 1, wherein the incident side dustproof glass has a plane size larger than a plane size of the opposed substrate and disposed on the light incident side of the frame, the frame has an edge that defines an opening in the frame, and the edge of the frame is located between a portion of the element substrate and a portion of the incident side dustproof glass.

12. The optical device according to claim 11, wherein the edge of the frame peripherally surrounds at least a portion of the opposed substrate.

13. The optical device according to claim 12, wherein the first surface of dustproof glass is located further from the light incident side end surface of the opposed substrate than the guiding portion.

14. The optical device according to claim 13, wherein the clearance is formed between the edge of the frame and an exit side surface portion of the incident side dustproof glass.

* * * * *